United States Patent
Xiong et al.

(10) Patent No.: US 11,002,528 B2
(45) Date of Patent: May 11, 2021

(54) SMART TERMINAL, AND GRAYSCALE TRACKING SENSING MODULE

(71) Applicant: UBTECH Robotics Corp, Shenzhen (CN)

(72) Inventors: Youjun Xiong, Shenzhen (CN); Jialong Kuang, Shenzhen (CN); Rui Gu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 305 days.

(21) Appl. No.: 16/236,362

(22) Filed: Dec. 29, 2018

(65) Prior Publication Data

US 2019/0346254 A1    Nov. 14, 2019

(30) Foreign Application Priority Data

May 8, 2018   (CN) .......................... 201810430659.9

(51) Int. Cl.
*G01B 11/00*    (2006.01)
*G01J 3/50*    (2006.01)
*G09G 3/00*    (2006.01)
*G05D 1/02*    (2020.01)

(52) U.S. Cl.
CPC .............. *G01B 11/002* (2013.01); *G01J 3/50* (2013.01); *G09G 3/006* (2013.01); *G05D 1/0231* (2013.01)

(58) Field of Classification Search
CPC ......... G01B 11/002; G01J 3/50; G09G 3/006; G05D 1/0231
See application file for complete search history.

(56) References Cited

U.S. PATENT DOCUMENTS

2009/0168119 A1* 7/2009 Chen ................... H04N 1/00753
358/474

FOREIGN PATENT DOCUMENTS

CN    206026048 U  *  3/2017  .............. A47J 31/00
KR    20170135628 A *  12/2017  ............... G06T 7/00

* cited by examiner

Primary Examiner — Jamil Ahmed

(57) ABSTRACT

A grayscale tracking sensing module includes: a main control unit, and a grayscale acquisition unit comprising at least five grayscale sensors electronically connected to the main control unit. The at least five grayscale sensors are formed a V-shape, with one of the grayscale sensors arranged at an apex of the V-shape and the rest of the grayscale sensors offsettingly arranged at two opposite sides of said one of the grayscale sensors. A smart terminal are also provided.

20 Claims, 6 Drawing Sheets

SMART TERMINAL, AND GRAYSCALE TRACKING SENSING MODULE

CROSS REFERENCE TO RELATED APPLICATIONS

This application claims priority to Chinese Patent Application No. 201810430659.9, filed May 8, 2018, which is hereby incorporated by reference herein as if set forth in its entirety.

BACKGROUND

1. Technical Field

The present disclosure generally relates to smart terminals, and particularly to a smart terminal, and a grayscale tracking sensing module.

2. Description of Related Art

A grayscale sensor is an analog sensor used to distinguish black from other colors. The grayscale sensor detects color depth of different detection surfaces according to different reflecting power of different colors to light. The grayscale sensor is mainly used for tracking control of a smart terminal or an unmanned vehicle. In order to achieve tracking, a grayscale comparison result value is usually adjusted by artificial visual inspection. Debuggers can only roughly estimate the grayscale comparison result by experience, and adjust the grayscale comparison result value in hand. For example, debuggers adjust the grayscale comparison result value by adjusting the adjustable resistance. The operating process is boring, and there is poor control accuracy and poor adaptability.

When multiple grayscale sensors are used for tracking control, the multiple grayscale sensors are usually connected together into a straight line type or connected together and arrayed in two lines. Accordingly, the multiple grayscale sensors easily interfere with each other, resulting in the poor control accuracy.

In summary, the traditional tracking control technique has some deficiencies, such as cumbersome adjusting operation, poor control accuracy, and poor adaptability.

BRIEF DESCRIPTION OF DRAWINGS

Many aspects of present embodiments can be better understood with reference to the following drawings. Components in the drawings are not necessarily drawn to scale, the emphasis placed upon clearly illustrating principles of the present embodiments. Moreover, in the drawings, all views are schematic, and like reference numerals designate corresponding parts throughout several views.

DETAILED DESCRIPTION

Figure 1:
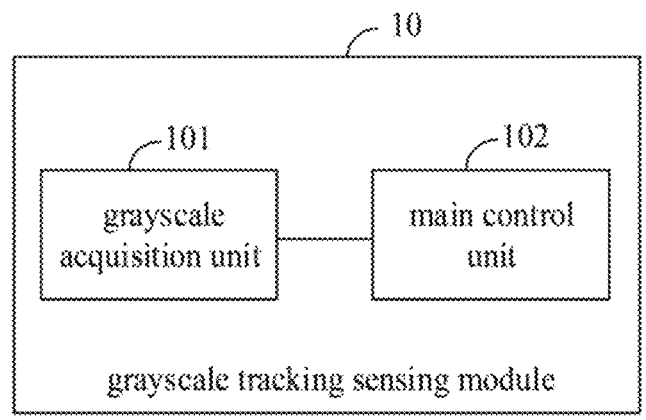
FIG. 1 is a schematic drawing of a grayscale tracking sensing module according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIG. 1 is a schematic drawing of a grayscale tracking sensing module according to an embodiment. As shown in FIG. 1, the grayscale tracking sensing module 10 includes a grayscale acquisition unit 101 and a main control unit 102. The grayscale acquisition unit 101 is electronically connected to the main control unit 102.

Figure 2:
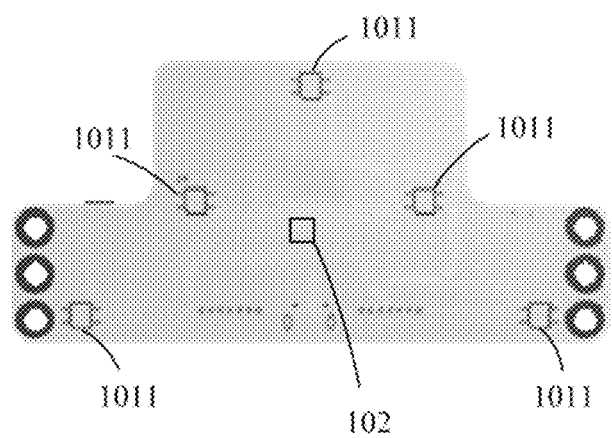
FIG. 2 is another schematic drawing of the grayscale tracking sensing module according to the embodiment.

In the embodiment, the grayscale acquisition unit 101 includes at least five grayscale sensors 1011. FIG. 2 is another schematic drawing of the grayscale tracking sensing module according to the embodiment. As shown in FIG. 2, the at least five grayscale sensors 1011 are electronically connected to the main control unit 102, and formed a V-shape, with one of the grayscale sensors 1011 arranged at an apex of the V-shape and the rest of the grayscale sensors 1011 offsettingly arranged at two opposite sides of said one of the grayscale sensors 1011.

Figure 3:
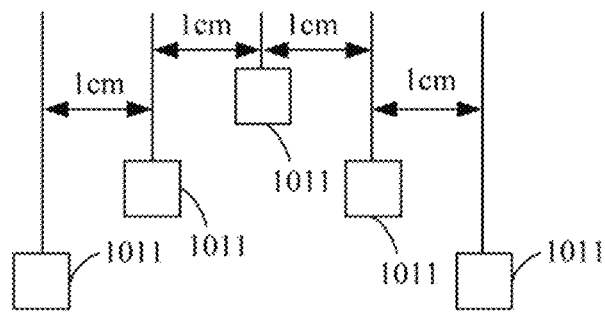
FIG. 3 is a distributing sketch drawing of at least five grayscale sensors 1011 of the grayscale acquisition unit 101 of FIG. 1.

FIG. 3 is a distributing sketch drawing of the at least five grayscale sensors 1011 of the grayscale acquisition unit 101 of FIG. 1. As shown in FIG. 3, the grayscale acquisition unit 101 includes five grayscale sensors 1011. The five grayscale sensors 1011 are formed a V-shape with three lines. The tip of the V-shape with three lines has one grayscale sensor 1011. Each of the rest of lines of the V-shape with three lines has two grayscale sensors 1011. The five grayscale sensors 1011 are spaced from each other in a distance.

Figure 4:
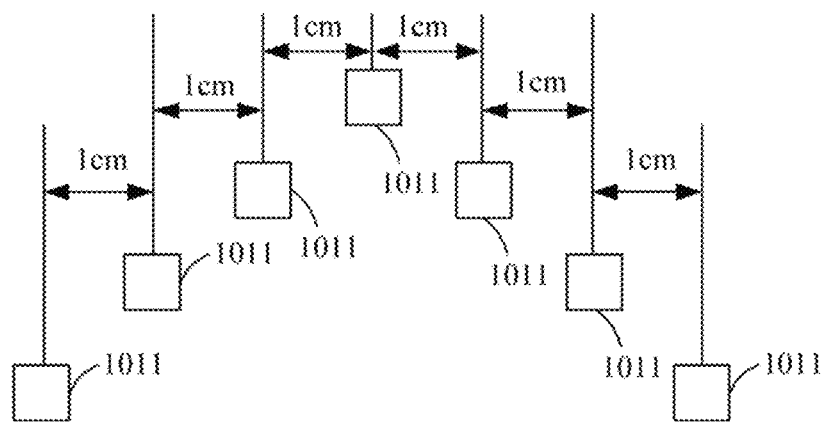
FIG. 4 is another distributing sketch drawing of the at least five grayscale sensors 1011 of the grayscale acquisition unit 101 of FIG. 1.

FIG. 4 is another distributing sketch drawing of the at least five grayscale sensors 1011 of the grayscale acquisition unit 101 of FIG. 1. As shown in FIG. 4, the grayscale acquisition unit 101 includes seven grayscale sensors 1011. The seven grayscale sensors 1011 are formed a V-shape with four lines. The tip of the V-shape with four lines has one grayscale sensor 1011. Each of the rest of lines of the V-shape with four lines has two grayscale sensors 1011. The seven sensors are spaced from each other in a distance.

In another embodiment, the grayscale acquisition unit 101 includes M grayscale sensors 10, M is an odd number greater than 7. The grayscale acquisition unit 101 with M grayscale sensors 1011 and the grayscale acquisition unit 101 with 5 or 7 grayscale sensors 1011 have the similar structure.

Figure 11:
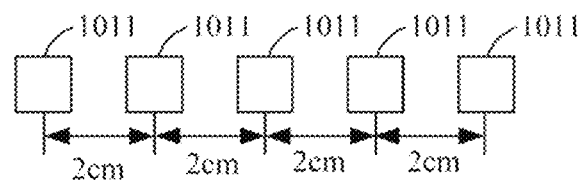
FIG. 11 is a schematic drawing of a conventional grayscale acquisition unit.

FIG. 11 is a schematic drawing of a conventional grayscale acquisition unit. As shown in FIG. 11, the five grayscale sensors 10 in the related art are arrayed in one line.

Figure 12:
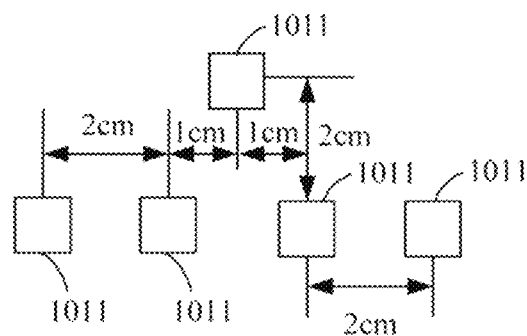
FIG. 12 is as schematic drawing of another conventional grayscale acquisition unit.

FIG. 12 is a schematic drawing of another conventional grayscale acquisition unit. As shown in FIG. 12, the five grayscale sensors 10 in the related art are arrayed in two lines.

In concrete application, the grayscale tracking sensing module 10 is mainly used to determine shapes of various junctions, when a smart car or a robot traveling in the tracking process or determining the direction of travel on the complex crossing. The accuracy of determination is seriously influenced by the distribution and the installation position of the grayscale sensors 1011 of the grayscale tracking sensing module 10. Therefore, the spacing between the grayscale sensors 1011 must not be larger than the detection width in design of distribution of the grayscale sensors, otherwise right shape of junction cannot be determined. In one embodiment, the detection width is width of a black line, such as width of a black tape. The black line is used to indicate the path of the smart car or the robot in the tracking process. Because black absorbs all light, the grayscale tracking sensing module 10 sends a feedback signal to the smart car or robot to make the smart car or robot to move along the black line, when the black line is determined. The grayscale sensors of five-channel grayscale tracking sensing module in the related art are usually arrayed in one line shown in FIG. 11 or two lines shown in FIG. 12, so the grayscale sensors interfere with each other easily, and the feedback signal can not be acquired stably. In one example, when the grayscale tracking sensing module in FIG. 11 or FIG. 12 is on the black line, because the grayscale sensors interfere with each other, a high-level as feedback control signal is sent (1). However, the correct feedback control signal is a low-level (0), actually. As shown in FIG. 3, FIG. 11 and FIG. 12, the width of the black line needs to be increased to eliminate interference between the grayscale sensors arrayed in one line or in two lines. Accordingly, the spacing between the grayscale sensors is greatly increased, and the volume of the grayscale tracking sensing module is also increased.

In the embodiment, the at least five grayscale sensors 1011 are distributed staggered and formed the V-shape. Accordingly, the interference between the grayscale sensors is effectively decreased, and the volume of the grayscale tracking sensing module is also relatively decreased.

In the embodiment, the spacing between the grayscale sensors is greatly decreased by the at least five grayscale sensors forming the V-shape. Accordingly, the volume of the grayscale tracking sensing module is decreased, the interference between the grayscale sensors is also decreased, and the control accuracy is improved. In the embodiment, the grayscale tracking sensing module is applied to different kinds of fields. The problems of cumbersome adjusting operation, poor control accuracy, and poor adaptability existing in the related art can be solved effectively.

In the embodiment, the at least five grayscale sensors 1011 detect grayscale values of a target object, and send the detected grayscale values to the main control unit 102. The main control unit 102 records and saves the detected grayscale values, compares the detected grayscale values with pre-recorded grayscale values, obtains a comparison result, and of a control level according to the comparison result.

In another embodiment, the at least five grayscale sensors 1011 further detect reference grayscale values of a reference object, and send detected reference grayscale values to the main control unit 102. The main control unit 102 further saves the detected reference grayscale values as the pre-recorded grayscale values.

Figure 5:
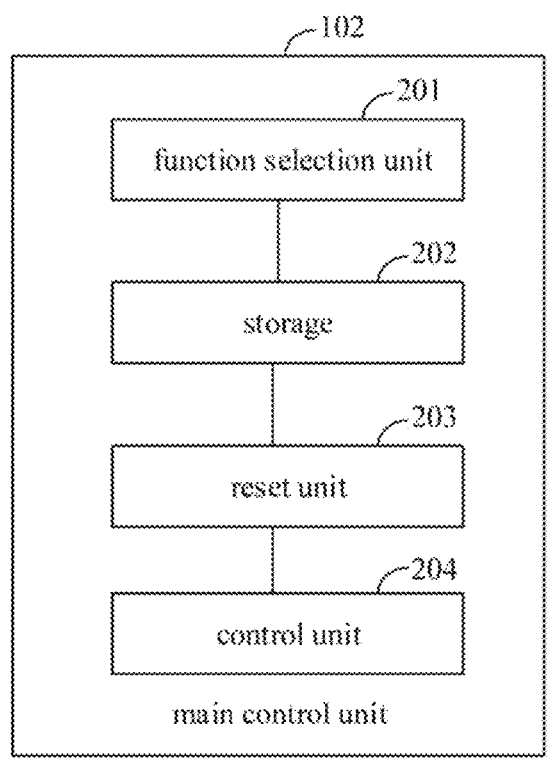
FIG. 5 is a schematic drawing of a main control unit 102 of the grayscale tracking sensing module according to the embodiment.

FIG. 5 is a schematic drawing of the main control unit 102 of the grayscale tracking sensing module according to the embodiment. As shown in FIG. 5, the main control unit 102 includes a function selection unit 201, a storage 202, a reset unit 203, and a control unit 204. The storage 22 is used for saving the detected grayscale values and detected reference grayscale values.

The function selection unit 201, the storage 202, and the reset unit 203 are electronically connected to the control unit 204.

In concrete application, the function selection unit 201 includes at least one function selection key. The at least one function selection key is used to select different functions of the grayscale tracking sensing module 10. The functions of the grayscale tracking sensing module 10 include a grayscale acquisition function and a grayscale acquisition recording function. The reset unit 203 includes a reset key configured for restoring the grayscale tracking sensing module 10 to its original state.

In concrete application, the grayscale tracking sensing module 10 enters a recording mode and performs operations of grayscale acquisition recording, when the grayscale acquisition recording function is selected by the function selection unit 201. Firstly, the function selection key is double-clicked to make the grayscale tracking sensing module 10 to enter the recording mode, then the grayscale tracking sensing module 10 is placed in a first color block of the reference object that needs to be read, and then the current color of the first color block detected by the grayscale acquisition unit 101 is recorded when the function selection key is pressed. Specifically, reference grayscale values of the current color of the first color black detected by the at least live grayscale sensors 1011 are read by at least five analog interlaces of the main control unit 102, and the detected reference grayscale values are saved as the pre-recorded grayscale values in the storage 202 of the main control unit 102. Secondly, the grayscale tracking sensing module 10 enters a grayscale acquisition mode by the function selection key, the grayscale tracking sensing module 10 is placed in a second color block of the target object that needs to be detected, and grayscale values of the current color of the second color block are acquired when the function selection key is pressed. The main control unit 102 reads the grayscale values acquired, compares the grayscale values acquired with the pre-recorded grayscale values to determine the depth of the first color block and the second color block, and outputs a control level according to the comparison result. For example, a high-level is outputted if the color of the target object is darker than the color of the first color block, and a low-level is outputted if the color of the target object is lighter than the color of the first color block. It should be noted that larger grayscale value indicates lighter color, and smaller grayscale value indicates darker color. The storage 202 includes a flash memory.

In one embodiment, the main control unit 10 includes a single-chip microcomputer and peripheral circuits of the single-chip microcomputer. Above functions are achieved by the single-chip microcomputer and the peripheral circuits of the single-chip microcomputer.

In concrete application, the at least five grayscale sensors 101 follow the same circuit structure.

Figure 6:
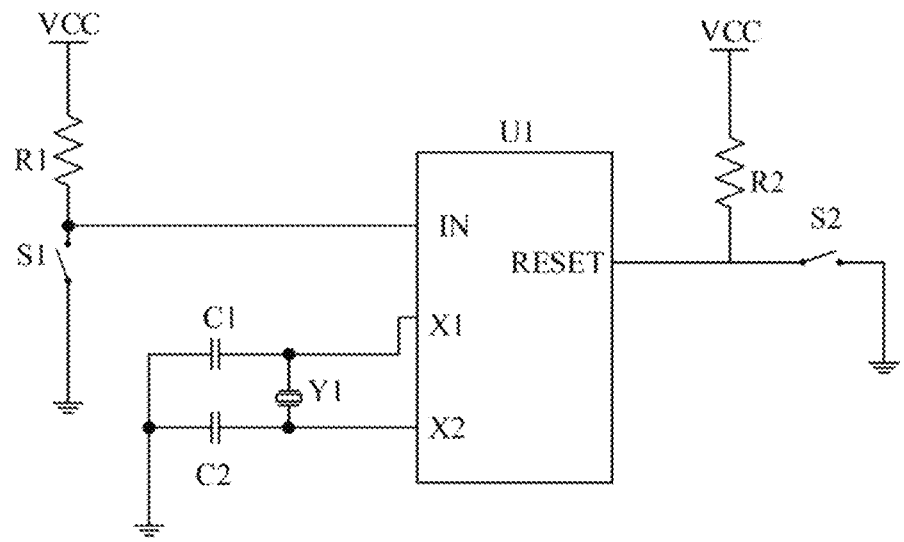
FIG. 6 is a circuit schematic drawing of the main control unit 102 of the grayscale tracking sensing module according to the embodiment.

FIG. 6 is a circuit schematic drawing of the main control unit 102 of the grayscale tracking sensing module according to the embodiment. As shown in FIG. 6, the main control unit 102 includes a control chip U1, a first resistance R1, a first key S1, a first capacitance C1, a second capacitance C2, a first crystal oscillator Y1, a second resistance R2, and a second key S2.

A first end of the first resistance R1 is electronically connected to a power supply VCC. A second end of the first resistance R1 is electronically connected to a first end of the first key S1. A second end of the first key S1 is electronically connected to a ground. The first end of the first key S1 is further electronically connected to an input pin IN of the control chip U1. A first end of the first capacitance C1 is electronically connected to a first end of the first crystal oscillator Y1. A second end of the first capacitance C1 is electronically connected to the ground. A first end of the second capacitance C2 is electronically connected to a second end of the first crystal oscillator Y1. A second end of the second capacitance C2 is connected to the ground. The first end of the first crystal oscillator Y1 is further electronically connected to a first clock pin X1 of the control chip U1. The second end of the first crystal oscillator Y1 is further electronically connected to a second clock pin X2 of the control chip U1. A first end of the second resistance R2 is electronically connected to the power supply VCC. A second end of the second resistance R2 is electronically connected to a reset pin RESET of the control chip U1. A first end of the second key S2 is electronically connected to the second end of the second resistance R2. A second end of the second key S2 is electronically connected to the ground.

Figure 7:
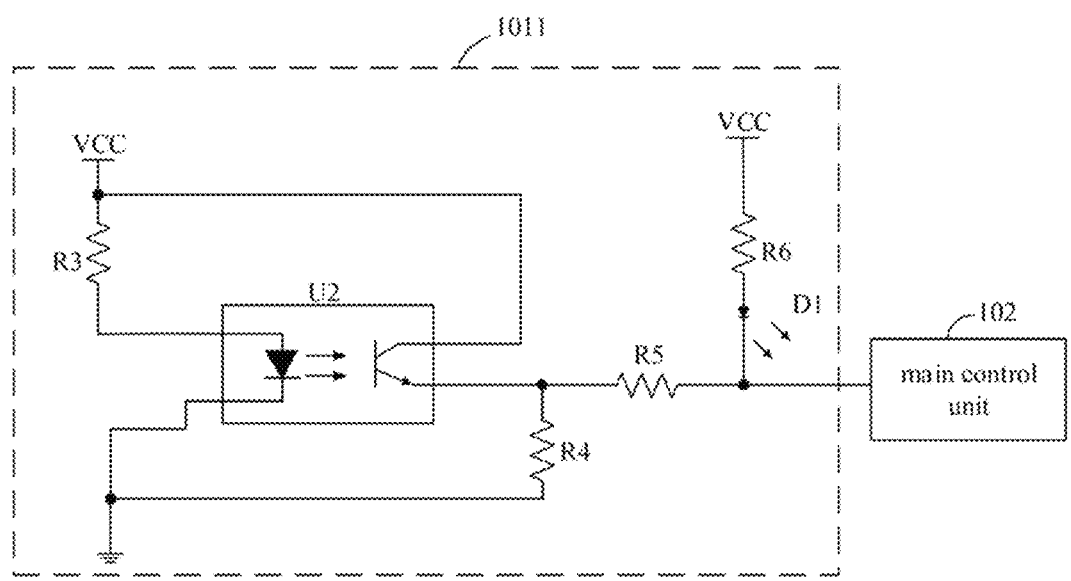
FIG. 7 is a circuit schematic drawing of each of the at least five grayscale sensors 1011 of the grayscale acquisition unit 101 of the grayscale tracking sensing module according to the embodiment.

FIG. 7 is a circuit schematic drawing of each of the at least five grayscale sensors 1011 of the grayscale acquisition unit 101 of the grayscale tracking sensing module according to the embodiment. As shown in FIG. 7, each of the at least five grayscale sensors 1011 includes a third resistance R3, a photocoupler U2, a fourth resistance R4, a fifth resistance R5, a sixth resistance R6, and a light-emitting diode D1. A first end of the third resistance R3 is electronically connected to the power supply VCC. A second end of the third resistance R3 is electronically connected to a first input end of the photocoupler U2. A second input end of the photocoupler U2 is electronically connected to the ground. A first output end of the photocoupler U2 is electronically connected to the power supply VCC. A second output end of the photocoupler U2 is electronically connected to a first end of the fourth resistance R4. A second end of the fourth resistance R4 is electronically connected to the ground. A first end of the fifth resistance R5 is electronically connected to a first end of the fourth resistance R4. A second end of the fifth resistance R5 is electronically connected to an anode of the light-emitting diode D1. A cathode of the photocoupler D1 is electronically connected to a first end of the sixth resistance R6. A second end of the sixth resistance R6 is electronically connected to the power supply VCC. The anode of the light-emitting diode D1 is electronically connected to the main control unit 102.

In concrete application, the power supply VCC is +5V direct current power supply.

In the embodiments above, the grayscale tracking sensing module 10 automatically records and saves the grayscale values of the target object detected by the at least five grayscale sensors 1011, compares the gray scale values with the pre-recorded grayscale values, and outputs the control level according to the comparison result, so that the automatically adjustment of grayscale comparison result value can be done. Accordingly, the problems of cumbersome adjusting operation, poor control accuracy, and poor adaptability existing in the related art can be solved.

Figure 8:
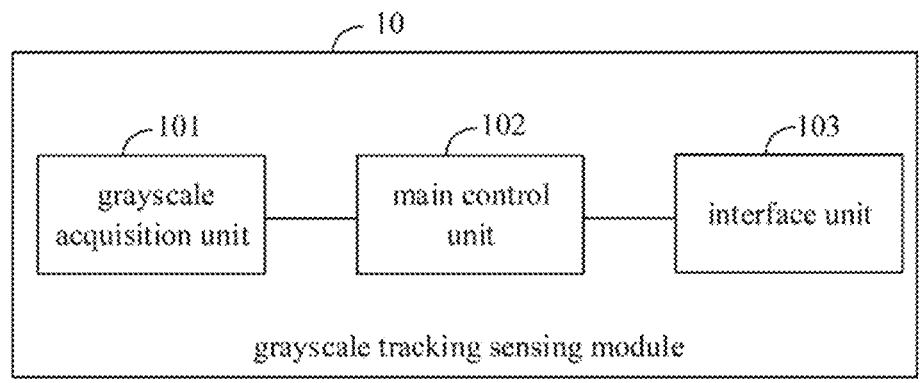
FIG. 8 is a schematic drawing of the grayscale tracking sensing module according to another embodiment.

FIG. 8 is a schematic drawing of the grayscale tracking sensing module according to another embodiment. As shown in FIG. 8, unlike the grayscale tracking sensing module shown in FIG. 1-FIG. 7, the grayscale tracking sensing module 10 further includes an interface unit 103.

The interface unit 103 is electronically connected to the main control unit 102.

In concrete application, the grayscale tracking sensing module 10 outputs the control level through the interface unit 103. The interface unit 103 is an USB interface unit.

Figure 9:
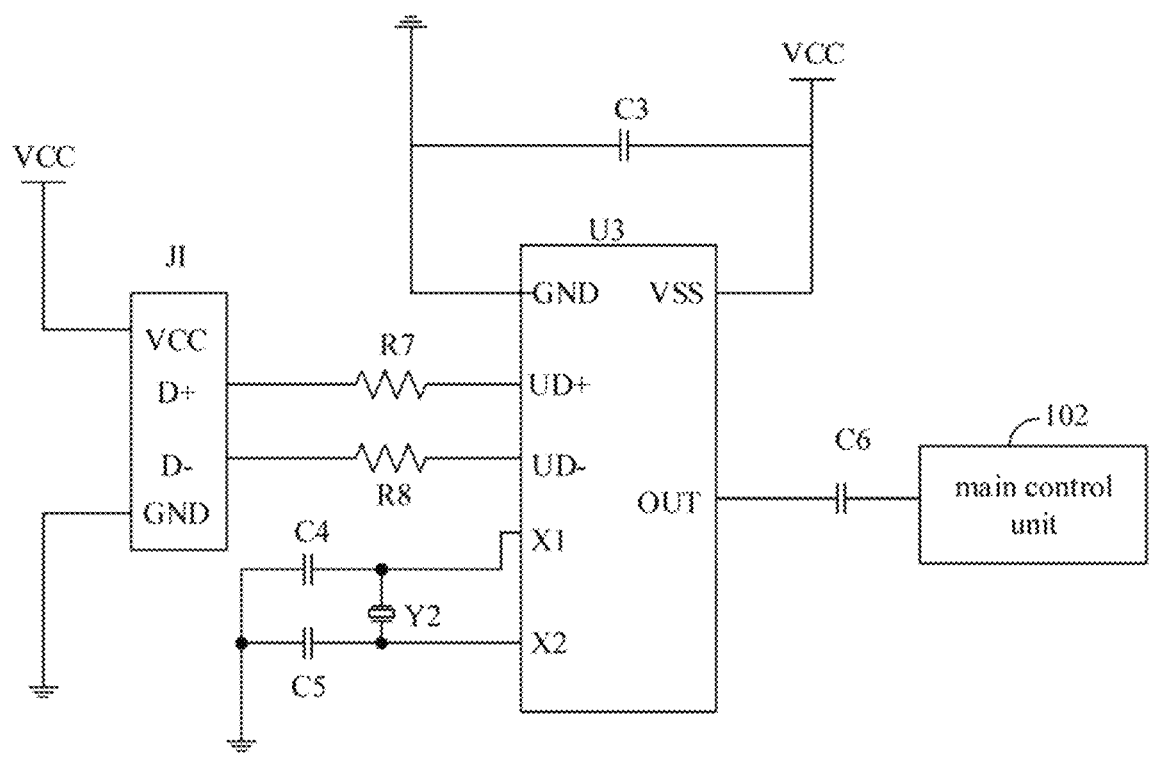
FIG. 9 is a circuit schematic drawing of an interface unit 103 of the grayscale tracking sensing module according to another embodiment.

FIG. 9 is a circuit schematic drawing of an interface unit 103 of the grayscale tracking sensing module according to another embodiment. As shown in FIG. 9, the interface unit 103 includes an interface conversion chip U3, an USB interface J1, a seventh resistance R7, an eighth resistance R8, a third, capacitance C3, a fourth capacitance C4, a fifth capacitance C5, a sixth capacitance C6, and a second crystal oscillator Y2.

A ground pin GND of the USB interface J1 is electronically connected to the ground. A power pin VCC of the USB interface J1 is electronically connected to the power supply VCC. A positive data pin D+ of the USB interface J1 is electronically connected to a first end of the seventh resistance R7. A negative data pin D− of the USB interface J1 is electronically connected to a first end of the eighth resistance R8. A second end of the seventh resistance R7 is electronically connected to a positive data pin UD+ of the interface conversion chip U3. A second end of the eighth resistance R8 is electronically connected to a negative data pin UD− of the interface conversion chip U3. A first end of the third capacitance C3 is electronically connected to the ground. A second end of the third capacitance C3 is electronically connected to the power supply VCC. The first end of the third capacitance C3 is further electronically connected to a ground pin GND of the interface conversion chip U3. A second end of the third capacitance C3 is electronically connected to a power pin VSS of the interface conversion chip U3. A first end of the fourth capacitance C4 is electronically connected to a first end of the second crystal oscillator Y2. A second end of the fourth capacitance C4 is electronically connected to the ground. A first end of the fifth capacitance C5 is electronically connected to a second end of the second crystal oscillator Y2. A second end of the fifth capacitance C5 is electronically connected to the ground. The first end of the second crystal oscillator Y2 is further electronically connected to a first clock pin X1 of the interface conversion chip U3. The second end of the second crystal oscillator Y2 is further electronically connected to a second clock pin X2 of the interface conversion chip U3. The first end of the sixth capacitance C6 is electronically connected to an output pin OUT of the interface conversion chip U3. A second end of the sixth capacitance C6 is electronically connected to the main control unit 102.

Figure 10:
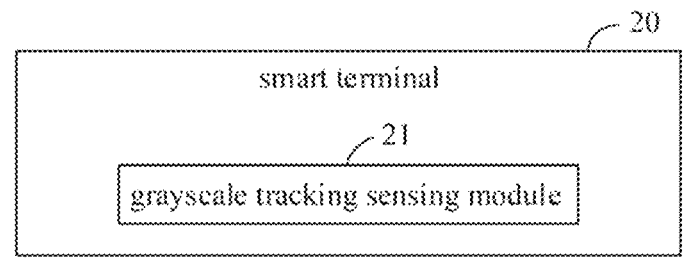
FIG. 10 is a schematic drawing of a smart terminal with the grayscale tracking sensing module of FIG. 1 or FIG. 8.

FIG. 10 is a schematic drawing of a smart terminal with the grayscale tracking sensing module of FIG. 1 or FIG. 8. As shown in FIG. 10, the smart terminal 20 includes a grayscale tracking sensing module 21. The grayscale tracking sensing module 21 follows the same structure as the grayscale tracking sensing module 10 shown in FIG. 1 or FIG. 8.

In the embodiment, the smart terminal 20 is a terminal used for tracking control, such as a robot, a smart car, an unmanned vehicle, etc. In the embodiment, there is no restriction on the type of the smart terminal.

In the embodiment, the smart terminal uses the main control unit to automatically record and save the grayscale values of the target object detected by the at least five grayscale sensors, compare the grayscale values with the pre-recorded grayscale values, and output the control level according to the comparison result, so that the automatically adjustment of grayscale comparison result value can be done. The spacing between the grayscale sensors is greatly decreased by the at least five grayscale sensors forming the V-shape. Accordingly, the volume of the grayscale tracking sensing module is decreased, the interference between the grayscale sensors is also effectively decreased, the control accuracy is improved. In the embodiment, the smart terminal is applied to different kinds of fields, and the problems of cumbersome adjusting operation, poor control accuracy, and poor adaptability existing in the related art can be solved.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A grayscale tracking sensing module, comprising:
   a main control unit; and
   a grayscale acquisition unit comprising at least five grayscale sensors electronically connected to the main control unit;
   wherein the at least five grayscale sensors are formed a V-shape, with one of the grayscale sensors arranged at an apex of the V-shape and the rest of the grayscale sensors offsettingly arranged at two opposite sides of said one of the grayscale sensors;
   the grayscale tracking sensing module is installed on a traveling smart terminal and instructs the traveling smart terminal with a travel path in a tracking process; and
   spacing between the at least five grayscale sensors is positive correlation with width of the travel path of the traveling smart terminal.

2. The grayscale tracking sensing module of claim 1, wherein the at least five grayscale sensors are configured for detecting grayscale values of a target object, and sending detected grayscale values to the main control unit, and wherein the target object is the travel path of the traveling smart terminal; and
   the main control unit is configured for recording and saving the detected grayscale values, comparing the detected grayscale values with pre-recorded grayscale values, outputting a high-level in response to the detected grayscale values being less than the pre-recorded grayscale values, and outputting a low-level in response to the detected grayscale values being greater than the pre-recoded grayscale values.

3. The grayscale tracking sensing module of claim 2, wherein the at least five grayscale sensors are further configured for detecting reference grayscale values of a reference object, and sending detected reference grayscale values to the main control unit; and the main control unit is further configured for saving the detected reference grayscale values as the pre-recorded grayscale values.

4. The grayscale tracking sensing module of claim 3, wherein the main control unit comprises a function selection unit, a storage, a reset unit, and a control unit, and the function selection unit, the storage, and the reset unit are electronically connected to the control unit;
   wherein the function selection unit is configured for selecting different functions of the grayscale tracking sensing module, the reset unit is configured for restoring the grayscale tracking sensing module to its original state, and the control unit is configured for recording and saving the detected grayscale values and the detected reference grayscale values in the storage, comparing the detected grayscale values with the pre-recorded grayscale values, outputting a high-level in response to the detected grayscale values being less than the pre-recorded grayscale values, and outputting a low-level in response to the detected grayscale values being greater than the pre-recorded grayscale values.

5. The grayscale tracking sensing module of claim 4, wherein the function selection unit comprises at least one function selection key, and the reset unit comprises a reset key.

6. The grayscale tracking sensing module of claim 2, wherein the at least five grayscale sensors follow the same circuit structure, the spacing between the at least five grayscale sensors is equal, and the spacing between the at least five grayscale sensors is not larger than the width of the travel path of the traveling smart terminal.

7. The grayscale tracking sensing module of claim 2, further comprising an interface unit electronically connected to the main control unit, wherein, the main control unit outputs the high-level or the low-level through the interface unit.

8. The grayscale tracking sensing module of claim 2, wherein the main control unit comprises a control chip, a first resistance, a first key, a first capacitance, a second capacitance, a first crystal oscillator, a second resistance, and a second key;
   a first end of the first resistance is electronically connected to a power supply;
   a second end of the first resistance is electronically connected to a first end of the first key;
   a second end of the first key is electronically connected to a ground;
   the first end of the first key is further electronically connected to an input pin of the control chip;
   a first end of the first capacitance is electronically connected to a first end of the first crystal oscillator;
   a second end of the first capacitance is electronically connected to the ground;
   a first end of the second capacitance is electronically connected to a second end of the first crystal oscillator;
   a second end of the second capacitance is electronically connected to the ground;
   the first end of the first crystal oscillator is further electronically connected to a first clock pin of the control chip;
   the second end of the first crystal oscillator is further electronically connected to a second clock pin of the control chip;
   a first end of the second resistance is electronically connected to the power supply;
   a second end of the second resistance is electronically connected to a reset pin of the control chip;
   a first end of the second key is electronically connected to the second end of the second resistance; and
   a second end of the second key is electronically connected to the ground.

9. The grayscale tracking sensing module of claim 6, wherein each of the at least five grayscale sensors comprises a third resistance, a photocoupler, a fourth resistance, a fifth resistance, a sixth resistance, and a light-emitting diode;

a first end of the third resistance is electronically connected to a power supply;
a second end of the third resistance is electronically connected to a first input end of the photocoupler;
a second input end of the photocoupler is electronically connected to a ground;
a first output end of the photocoupler is electronically connected to the power supply;
a second output end of the photocoupler is electronically connected to a first end of the fourth resistance;
a second end of the fourth resistance is electronically connected to the ground;
a first end of the fifth resistance is electronically connected to a first end of the fourth resistance;
a second end of the fifth resistance is electronically connected to an anode of the light-emitting diode;
a cathode of the photocoupler is electronically connected to a first end of the sixth resistance;
a second end of the sixth resistance is electronically connected to the power supply; and
the anode of the light-emitting diode is electronically connected to the main control unit.

10. The grayscale tracking sensing module of claim 7, wherein the interface unit comprises an interface conversion chip, an USB interface, a seventh resistance, an eighth resistance, a third capacitance, a fourth capacitance, a fifth capacitance, a sixth capacitance, and a second crystal oscillator;
a ground pin of the USB interface is electronically connected to the ground;
a power pin of the USB interface is electronically connected to the power supply;
a positive data pin of the USB interface is electronically connected to a first end of the seventh resistance;
a negative data pin of the USB interface is electronically connected to a first end of the eighth resistance;
a second end of the seventh resistance is electronically connected to a positive data pin of the interface conversion chip;
a second end of the eighth resistance is electronically connected to a negative data pin of the interface conversion chip;
a first end of the third capacitance is electronically connected to the ground;
a second end of the third capacitance is electronically connected to the power supply;
the first end of the third capacitance is further electronically connected to a ground pin of the interface conversion chip;
a second end of the third capacitance is further electronically connected to a power pin of the interface conversion chip;
a first end of the fourth capacitance is electronically connected to a first end of the second crystal oscillator;
a second end of the fourth capacitance is electronically connected to the ground;
a first end of the fifth capacitance is electronically connected to a second end of the second crystal oscillator;
a second end of the fifth capacitance is electronically connected to the ground;
the first end of the second crystal oscillator is further electronically connected to a first clock pin of the interface conversion chip;
the second end of the second crystal oscillator is further electronically connected to a second clock pin of the interface conversion chip;
a first end of the sixth capacitance is electronically connected to an output pin of the interface conversion chip; and
a second end of the sixth capacitance is electronically connected to the main control unit.

11. A smart terminal, comprising a grayscale tracking sensing module, wherein the grayscale tracking sensing module comprises a main control unit and a grayscale acquisition unit, the grayscale acquisition unit comprises at least five grayscale sensors electronically connected to the main control unit, the at least five grayscale sensors are formed a V-shape, with one of the grayscale sensors arranged at an apex of the V-shape and the rest of the grayscale sensors offsettingly arranged at two opposite sides of said one of the grayscale sensors;
the smart terminal is a traveling smart terminal, and the grayscale tracking sensing module instructs the smart terminal with a travel path in a tracking process; and
spacing between the at least five grayscale sensors is positive correlation with width of the travel path of the traveling smart terminal.

12. The smart terminal of claim 11, wherein the at least five grayscale sensors are configured for detecting grayscale values of a target object, and sending detected grayscale values to the main control unit, and wherein the target object is the travel path of the traveling smart terminal; and
the main control unit is configured for recording and saving the detected grayscale values, comparing the detected grayscale values with pre-recorded grayscale values, outputting a high-level in response to the detected grayscale values being less than the pre-recorded grayscale values, and outputting a low-level in response to the detected grayscale values being greater than the pre-recorded grayscale values.

13. The smart terminal of claim 12, wherein the at least five grayscale sensors are further configured for detecting reference grayscale values of a reference object, and sending detected reference grayscale values to the main control unit; and the main control unit is further configured for saving the detected reference grayscale values as the pre-recorded grayscale values.

14. The smart terminal of claim 13, wherein the main control unit comprises a function selection unit, a storage, a reset unit, and a control unit, and the function selection unit, the storage, and the reset unit are electronically connected to the control unit;
wherein the function selection unit is configured for selecting different functions of the grayscale tracking sensing module, the reset unit is configured for restoring the grayscale tracking sensing module to its original state, and the control unit is configured for recording and saving the detected grayscale values and the detected reference grayscale values in the storage, comparing the detected grayscale values with the pre-recorded grayscale values, outputting a high-level in response to the detected grayscale values being less than the pre-recorded grayscale values, and outputting a low-level in response to the detected grayscale values being greater than the pre-recorded grayscale values.

15. The smart terminal of claim 14, wherein the function selection unit comprises at least one function selection key, and the reset unit comprises a reset key.

16. The smart terminal of claim 12, wherein the at least five grayscale sensors follow the same circuit structure, the spacing between the at least five grayscale sensors is equal, and the spacing between the at least five grayscale sensors is not larger than the travel path of the traveling smart terminal.

17. The smart terminal of claim 12, wherein the grayscale tracking sensing module further comprises an interface unit electronically connected to the main control unit, wherein, the main control unit outputs the high-level or the low-level through the interface unit.

18. The smart terminal of claim 12, wherein the main control unit comprises a control chip, a first resistance, a first key, a first capacitance, a second capacitance, a first crystal oscillator, a second resistance, and a second key;
    a first end of the first resistance is electronically connected to a power supply;
    a second end of the first resistance is electronically connected to a first end of the first key;
    a second end of the first key is electronically connected to a ground;
    the first end of the first key is further electronically connected to an input pin of the control chip;
    a first end of the first capacitance is electronically connected to a first end of the first crystal oscillator;
    a second end of the first capacitance is electronically connected to the ground;
    a first end of the second capacitance is electronically connected to a second end of the first crystal oscillator;
    a second end of the second capacitance is electronically connected to the ground;
    the first end of the first crystal oscillator is further electronically connected to a first clock pin of the control chip;
    the second end of the first crystal oscillator is further electronically connected to a second clock pin of the control chip;
    a first end of the second resistance is electronically connected to the power supply;
    a second end of the second resistance is electronically connected to a reset pin of the control chip;
    a first end of the second key is electronically connected to the second end of the second resistance; and
    a second end of the second key is electronically connected to the ground.

19. The smart terminal of claim 16, wherein each of the at least five grayscale sensors comprises a third resistance, a photocoupler, a fourth resistance, a fifth resistance, a sixth resistance, and a light-emitting diode;
    a first end of the third resistance is electronically connected to a power supply;
    a second end of the third resistance is electronically connected to a first input end of the photocoupler;
    a second input end of the photocoupler is electronically connected to a ground;
    a first output end of the photocoupler is electronically connected to the power supply;
    a second output end of the photocoupler is electronically connected to a first end of the fourth resistance;
    a second end of the fourth resistance is electronically connected to the ground;
    a first end of the fifth resistance is electronically connected to a first end of the fourth resistance;
    a second end of the fifth resistance is electronically connected to an anode of the light-emitting diode;
    a cathode of the photocoupler is electronically connected to a first end of the sixth resistance;
    a second end of the sixth resistance is electronically connected to the power supply; and
    the anode of the light-emitting diode is electronically connected to the main control unit.

20. The smart terminal of claim 17, wherein the interface unit comprises an interface conversion chip, an USB interface, a seventh resistance, an eighth resistance, a third capacitance, a fourth capacitance, a fifth capacitance, a sixth capacitance, and a second crystal oscillator;
    a ground pin of the USB interface is electronically connected to the ground;
    a power pin of the USB interface is electronically connected to the power supply;
    a positive data pin of the USB interface is electronically connected to a first end of the seventh resistance;
    a negative data pin of the USB interface is electronically connected to a first end of the eighth resistance;
    a second end of the seventh resistance is electronically connected to a positive data pin of the interface conversion chip;
    a second end of the eighth resistance is electronically connected to a negative data pin of the interface conversion chip;
    a first end of the third capacitance is electronically connected to the ground;
    a second end of the third capacitance is electronically connected to the power supply;
    the first end of the third capacitance is further electronically connected to a ground pin of the interface conversion chip;
    a second end of the third capacitance is further electronically connected to a power pin of the interface conversion chip;
    a first end of the fourth capacitance is electronically connected to a first end of the second crystal oscillator;
    a second end of the fourth capacitance is electronically connected to the ground;
    a first end of the fifth capacitance is electronically connected to a second end of the second crystal oscillator;
    a second end of the fifth capacitance is electronically connected to the ground;
    the first end of the second crystal oscillator is further electronically connected to a first clock pin of the interface conversion chip;
    the second end of the second crystal oscillator is further electronically connected to a second clock pin of the interface conversion chip;
    a first end of the sixth capacitance is electronically connected to an output pin of the interface conversion chip; and
    a second end of the sixth capacitance is electronically connected to the main control unit.

* * * * *